United States Patent [19]

Rommel

[11] Patent Number: 4,881,436

[45] Date of Patent: Nov. 21, 1989

[54] TRANSVERSE CUTTER FOR SHEET MATERIALS

[75] Inventor: Jörg Rommel, Reutlingen, Fed. Rep. of Germany

[73] Assignee: Bielomatik Leuze GmbH & Co., Fed. Rep. of Germany

[21] Appl. No.: 267,611

[22] Filed: Nov. 1, 1988

Related U.S. Application Data

[63] Continuation of Ser. No. 20,752, Mar. 2, 1987, abandoned.

[30] Foreign Application Priority Data

Mar. 12, 1986 [DE] Fed. Rep. of Germany ....... 3608111

[51] Int. Cl.[4] ......................... B23D 25/12; B26D 1/40

[52] U.S. Cl. .................................. 83/342; 74/665 D; 83/343; 83/672; 83/700

[58] Field of Search ................. 83/299, 310, 311, 342, 83/343, 344, 345, 504, 663, 672, 700; 74/392, 411, 665 D; 464/79, 80

[56] References Cited

U.S. PATENT DOCUMENTS

| | | | |
|---|---|---|---|
| 3,233,428 | 2/1966 | Chalpin | 464/79 |
| 3,328,976 | 7/1967 | Shoemaker et al. | 74/665 D |
| 3,405,580 | 10/1968 | Hallden | 83/343 |
| 3,899,945 | 8/1975 | Garrett et al. | 83/299 |
| 4,224,848 | 9/1980 | Beerenwinkel | 83/344 |
| 4,264,229 | 4/1981 | Falk et al. | 403/31 |
| 4,416,948 | 10/1986 | Jelfs | 403/31 |
| 4,420,999 | 12/1983 | Hirakawa et al. | 83/343 |
| 4,435,817 | 3/1984 | Krogsrud | 403/31 |
| 4,493,235 | 1/1985 | Martin | 83/345 |

FOREIGN PATENT DOCUMENTS

| | | | |
|---|---|---|---|
| 109686 | 8/1979 | Japan | 83/344 |

*Primary Examiner*—Hien H. Phan
*Attorney, Agent, or Firm*—Steele, Gould & Fried

[57] ABSTRACT

A transverse cutter for fine papers consists of two mutually co-operating cutter rolls, of which one is directly driven by two electric motors. The upper cutter spindle is driven with the lower cutter spindle by a gear wheel driver at each end, which drive has an inclined set of teeth with constant pitch circle diameter and can be adjusted by axial displacement to be free from backlash. By means of a hydraulic clamping bushing provided between gear wheel and cutter spindle, a radial prestress between the gear wheels is obtained, which makes possible a backlash-free setting around the entire circumference.

10 Claims, 3 Drawing Sheets

TRANSVERSE CUTTER FOR SHEET MATERIALS

CROSS REFERENCE TO RELATED APPLICATION

This is a continuation of application Ser. No. 020,752, filed Mar. 2, 1987, now abandoned.

FIELD OF THE INVENTION

This invention relates to a transverse cutter for sheet materials, especially paper.

BACKGROUND OF THE INVENTION

Transverse cutters which cut sheets from sheet materials, for example rolls of paper, which sheets are then optionally sorted and placed in stacks, operate at high paper speeds and must be adjustable to different formats.

DESCRIPTION OF THE PRIOR ART

Known transverse cutters each consist of two cutter spindles, which usually have one knife each at the periphery, both the knives being adjusted to extremely small cutting gaps of the order of magnitude of hundredths of a millimeter and being disposed obliquely to the axis of the cutter spindle for the purpose of generating a continuous cut. To enable different formats to be cut with cutter spindles of constant diameter, the cutter spindles have hitherto been driven by non-uniformity gears, which retard the rotational speed of the cutter spindles, for example for cutting a format which is longer than the synchronous format determined by the circumference of the cutter spindles and, at the moment of cutting, again accelerate it up to sheet speed. As a consequence of the approximately sinusoidal speed curve generated by the non-uniformity gear, the speed is, however, not quite constant even during the cut, because due to the oblique setting of the knives the cut requires a certain time. This leads to certain deviations in the accuracy of cut, which hitherto have been accepted.

Especially in those transverse cutters that are driven at the non-uniform speed of the cutter spindle, it has been necessary so to adjust the synchronization of the two cutter spindles, which is effected by a gear wheel drive, that at the moment of cutting virtually no tooth backlash is any longer present, because otherwise an accurate cut, which requires the most exact knife adjustment, is no longer possible or the knives are destroyed. As a consequence of the unavoidable manufacturing inaccuracies, however, it has hitherto been possible to achieve a backlash-free setting of gear wheels only at one point of the circumference, namely at the point at which the gear wheels, due to the so-called "high swing", come closest together At all other points of the periphery, a more or less large clearance then occurs, which indeed is in the region of hundredths of a millimeter, but nevertheless would have prevented an exact run of the knives relative to each other. For this reason, in transverse cutters of this class, it has only been possible to provide a plurality of knives at the circumference with accompanying loss of quality.

It has already been attempted, in the corrugated cardboard industry, to cause cutter spindles to be directly driven by electric motors. Considerably less stringent requirements in respect of accuracy are then imposed at the cut, however, so that the cutting quality is also reduced.

OBJECT OF THE INVENTION

An object of the present invention is to create a transverse cutter for sheet materials, which shall make possible high cutting quality and in which, in particular, the knives shall be extremely accurately adjustable relative to each other and wherein this adjustment can be maintained exactly in all operating conditions.

SUMMARY OF THE INVENTION

According to one aspect of the present invention, there is provided a transverse cutter for sheet materials, especially paper, comprising two rotatable cutter spindles, at least one knife disposed at the periphery of each cutter spindle, a drive for the cutter spindles and at least one gear wheel drive for synchronizing rotation of the two cutter spindles, said at least one gear wheel drive having mutually co-operating gear wheels in meshing engagement under prestress and a resilient element being disposed between one of said gear wheels and one of said cutter spindles.

The resilient element can, for example, be a hydraulic clamping bush, hitherto known only as clamping element, which at the same time firmly clamps the relevant gear wheel onto the cutter spindle, but nevertheless permits a limited, resilient radial movement in combination with a high torsional stiffness.

This prestress of the gear wheels relative to each other makes it possible for the gear wheels to run free of backlash at virtually all positions of the circumference. The transverse cutter is no longer at risk due to vibrations originating from the drive or from other sources, which otherwise could wear not only the knives but also other drive components in a very short time. It is also possible, in spite of highly accurate cutting adjustment, to provide a plurality of knives at the circumference to the cutter spindle. It has hitherto been considered impossible to adjust gear wheels so as to be backlash-free around the entire circumference, because they would destroy themselves; they would undergo, in the region of the "high swing", such high tooth flank bearing pressures that lubricant could no longer remain between the tooth flanks and they would therefore be destroyed in a very short time. By the prestressing of the gear wheels, however, it is possible to reduce this tooth flank pressure to a desired degree, which is still just sufficient for retaining an oil film.

It is thus also possible to create, for the first time, a functionally effective transverse cutter for high cutting quality, which operates with an electric motor direct drive. The extraordinarily high accelerations and braking torques which then act upon the gear wheel drive, and also the vibrations originating from the electronically controlled motor drive destroyed the knives and the gear wheel drives in an extremely short time in preliminary tests. By the backlash-free synchronization of the present cutter, it has been possible to eliminate this problem.

According to another aspect of the present invention, there is provided a transverse cutter for sheet materials, especially paper, comprising two rotatable cutter spindles, at least one knife disposed at the periphery of each cutter spindle, a drive for the cutter spindles and at least one gear wheel drive for synchronizing rotation of the two cutter spindles, said at least one gear wheel drive having mutually co-operating gear wheels in meshing engagement under prestress and a resilient element being disposed between one of said gear wheels and one of said cutter spindles, the cutter further comprising at least one electric motor is connected coaxially without intermediate gear with one of said cutter spindles, which electric motor has an extremely short start-up and electrically produced braking time and the start-up and braking of which is controlled by an electronic control device for the purpose of cutting formats which are different from the synchronous format determined by the effective circumference of the cutter spindles, the cutter spindles being accelerated and again braked within a fraction of one revolution, possibly several times per second, between cutting speed and stop or some other speed.

BRIEF DESCRIPTION OF THE DRAWINGS

For a better understanding of the invention and to show how the same may be carried into effect, reference will now be made by way of example, to the accompanying drawings, in which.

DESCRIPTION OF THE PREFERRED EMBODIMENT

Figure 1:
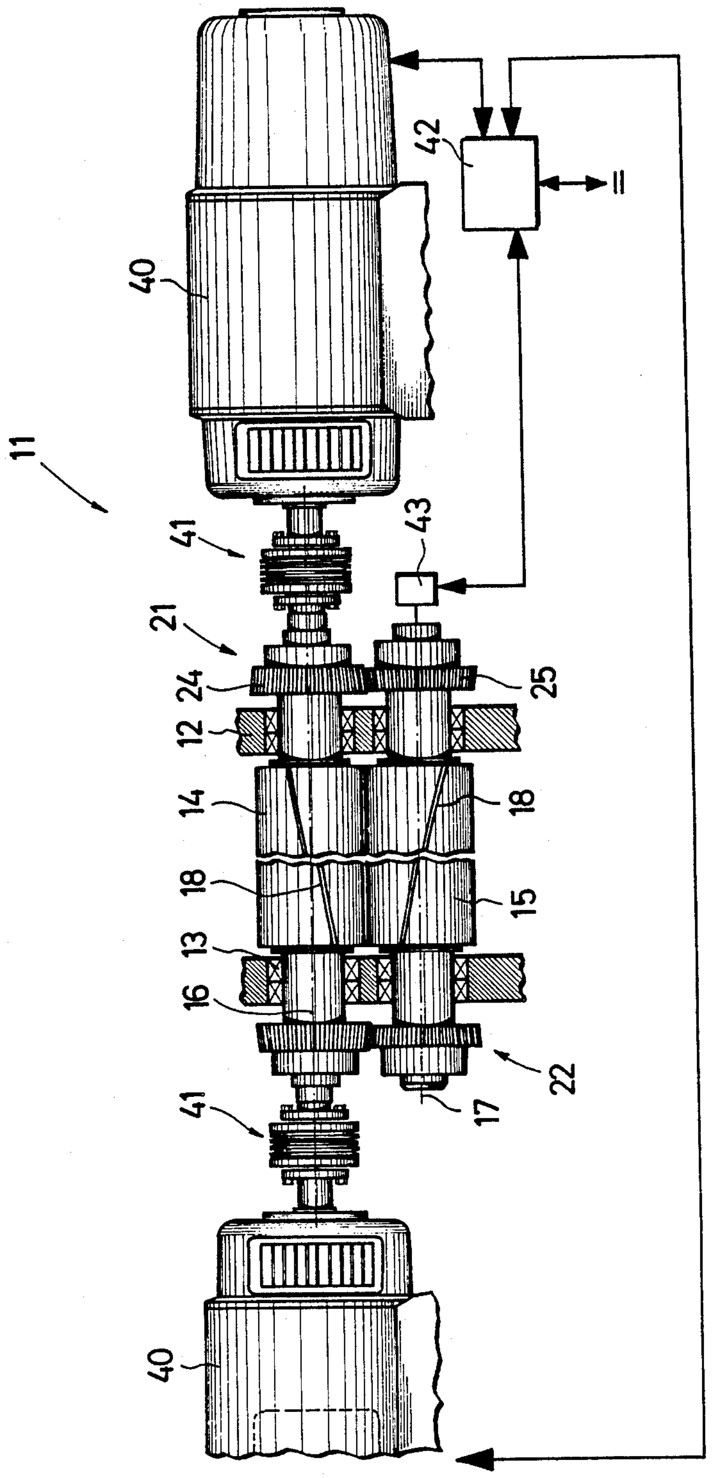
FIG. 1 is a schematic section through a transverse cutter, viewed on the cutter spindles and their drive, FIG. 2 cross-section to a larger scale through the cutter spindles (in the cutting position)
Figure 2:
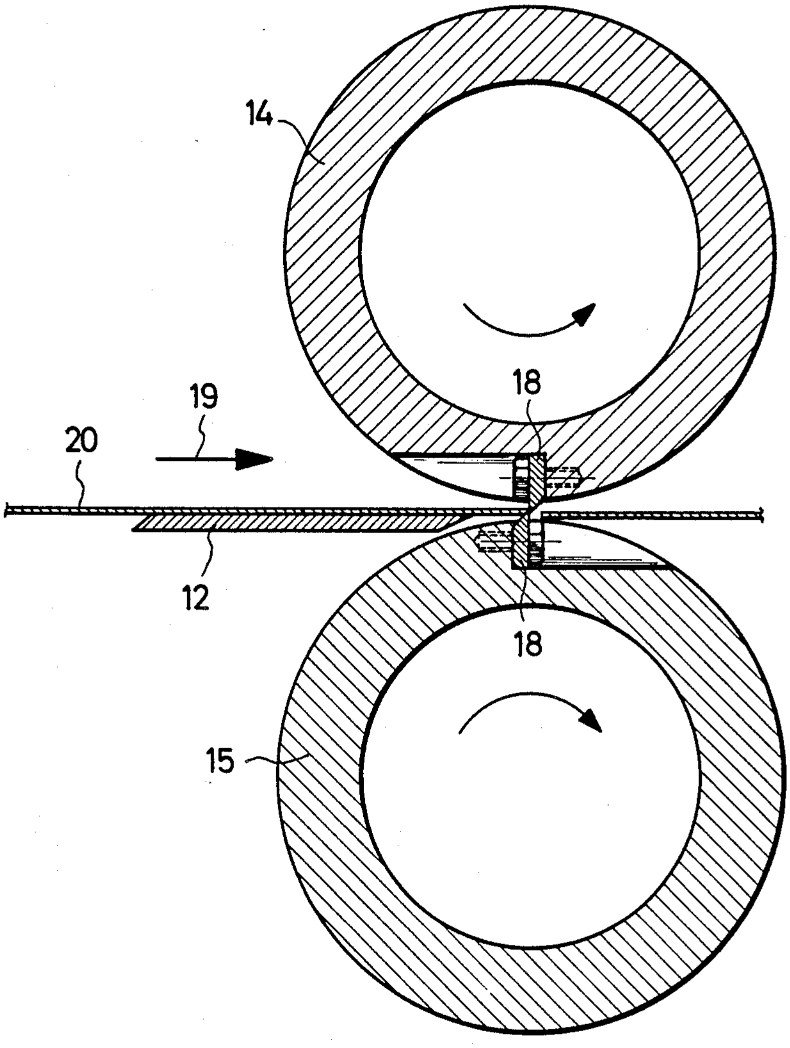

A transverse cutter 11 partly shown in FIG. 1 serves for accurately cutting rolls of paper into sheets. These transverse cutters are high-precision machines, which can handle sheet materials having a width of 2 m or more at operating speeds of several hundreds of meters per minute. Cutter spindles 14, 15, journalled above one another in a frame 12 by means of bearings 13, are shown in the drawing reduced in length. They each carry, at their circumference, a knife 18, disposed obliquely to the cutter spindle axes 16, 17. The two knives 18 are, as can be seen also from FIG. 2, accurately adjusted relative to each other with cutting gaps of the order of thousandths of a millimeter, and cut sheet material 20, entering in a working direction 19, with high accuracy and in a clean, absolutely fringe-free cut across the entire width.

Figure 3:
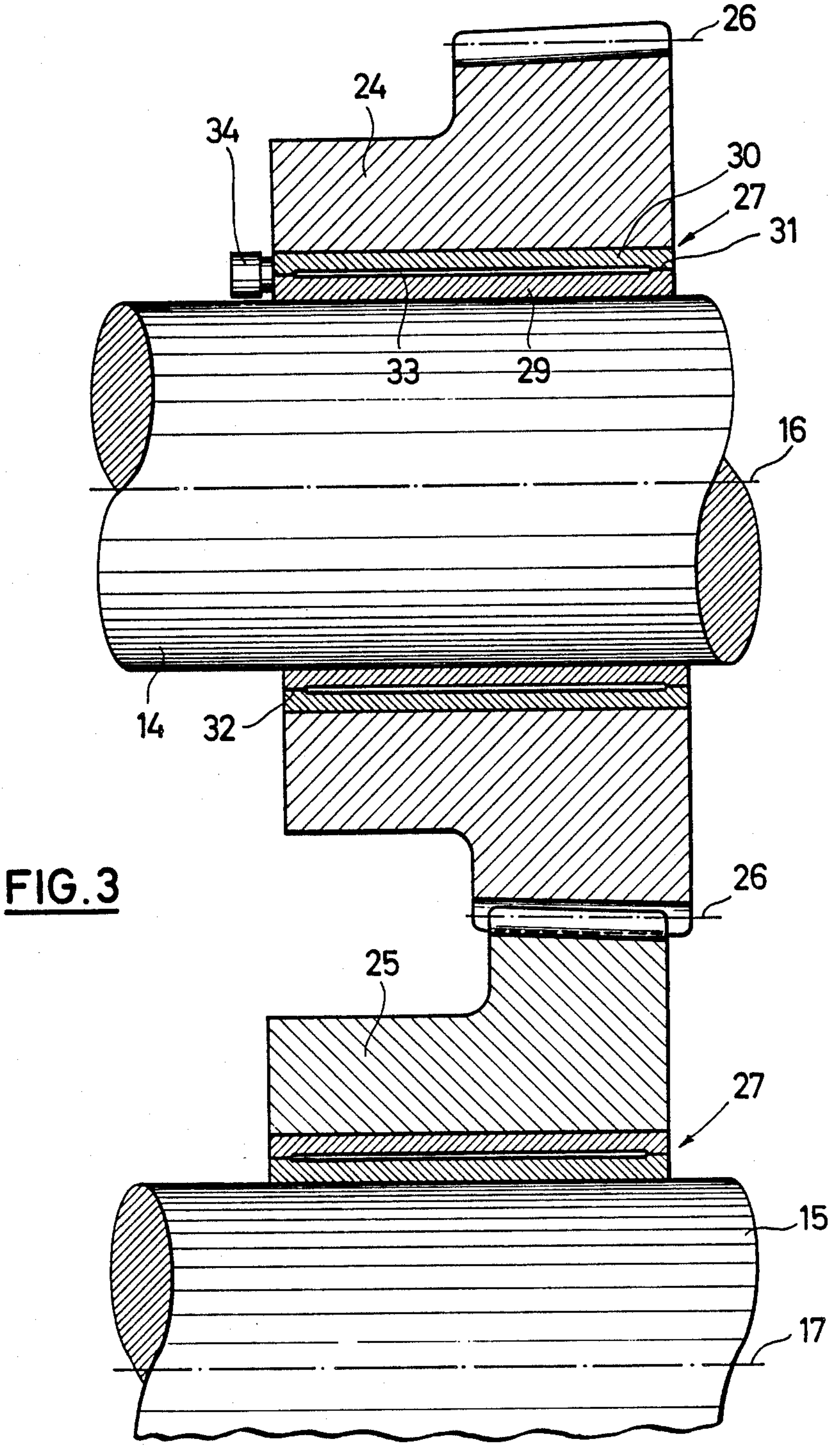
FIG. 3 is an enlarged section through a gear wheel drive for synchronizing the two cutter spindles.

The cutter spindles 14, 15 are accurately synchronized with each other via two gear wheel drives 21, 22 provided at their two ends, so that the knives operate with one another with the accurately set cutting gap reproducibly in all operating circumstances. Gear wheel drives 21, 22 each consist of two gear wheels 24, 25, which have the same number of teeth and equal pitch circle diameters and therefore drive the parallel-axis cutter spindles 14, 15 at the same rotational speed in opposite directions. The gear wheels 24, 25, co-operating with one another in the manner of spur gears, have, in spite of a constant diameter of the pitch circle 26 along the entire axial length of the teeth, which pitch circle thus lies on a cylindrical surface, a corresponding conicity at the two gear wheels 24, 25. This conicity is produced during the manufacture of the gear wheels by a radial displacement of the tooth profile progressing along the length of the teeth. The angle of the gear wheel inclination relative to the axial or pitch circle direction which determines the conicity (half cone angle) lies in the range between 0.2° and 5°, preferably 1° to 2°, according to the requirements. In this way it is ensured that, in spite of a satisfactory co-operation of the gear wheels, an axial displacement of the gear wheels relative to one another makes possible an adjustment of the radial tooth clearance. Accordingly, the gear wheels 24, 25, which can be seen particularly from FIG. 3, can be displaced in their adjustment of the auxiliary devices along the cutter spindle axes 16, 17 sufficiently far relative to each other for the tooth clearance at all positions of the circumference to be eliminated and a certain prestress to be present in the tooth engagement, in other words even at the position at which the greatest tooth clearance would theoretically occur, an all-round contact pressure is still present between the gear wheels, which ensures that the gear wheels cannot produce any play even under a change of load or vibrations. In this adjustment, the gear wheels are clamped on the cutter spindles 14, 15, this clamping being by means of resilient elements 27, which are both clamping elements and also radial spring elements.

The resilient elements 27 each consist of two mutually concentric steel sleeves 29, 30, which are connected together in the region of their ends by sealing welds 31. Between the two sleeves, a very slender annular chamber 33 is thereby produced in the non-welded zone, which chamber is connected to a hydraulic oil valve 34. A resilient element 27 of this type is pushed onto each cutter spindle 14, 15, and a gear wheel 24, 25 fits on the external diameter of each outer sleeve 30. The fits between the resilient elements and the components 14, 24 to be connected together by it are small, but are of the order of magnitude that is desired in the radial elasticity. After axial setting of the gear wheels relative to each other has been carried out, a high hydraulic pressure is introduced into the annular chamber 33 via the hydraulic filler valve 34, this pressure being, for example, in the range between 500 and 1000 bars. As a result, the two sleeves expand inwards and outwards respectively and firmly clamp the gear wheels 24, 25 onto their respective shafts 14, 15 without play.

The resilient elements are, due to the direct connection of the sleeves 29, 30 around their entire periphery by the welds 31, 32, virtually inelastic and torsionally stiff in the direction of rotation. In the radial direction, however, it is resilient, although with a very high spring stiffness, which preferably is greater than 1,000,000 N/mm. The slightly inflated sleeves, within the amount by which they have been inflated, make possible radial, movement of the outer sleeve relative to the cutter spindle 14 in the manner of a bellows spring, but the hydraulic oil 33 contained in the annular chamber behaves neutrally in the spring sense, because it can flow in the chamber from one side to the other. The springing action is therefore possible without the torsional stiffness or clamping effect of the element 27 being in any way adversely affected. Thus it is possible to ensure a prestress between the gear wheels around the entire circumference.

From FIG. 1 it can be seen that the upper cutter spindle 14 is driven by two electric motors 40, which are mounted coaxially with it at the two ends and each are connected directly via a metal bellows coupling 41 and without the intermediary of any kind of gear elements to the cutter spindle.

The metal bellows coupling 41 possesses a metal corrugated bellows disposed between two flanges, fixed to the motor shaft and cutter spindle respectively, this bellows being capable of accommodating slight errors of alignment etc. at very high torsional stiffness. This also contributes to the feature that no free or resilient play can occur in the drive train.

The electric motors are special direct current motors, which are intermittently driven by an electronic control 42 as a function of various data. The adjustment or setting data for the control device 42 includes the output from an incremental emitter 43 disposed on the lower cutter spindle 15, and also data about the speed of the entering material sheet 20 and the desired format length. As a function of these data, the two motors 40 are so controlled that they are accelerated, for example from the stopped situation in approximately 20 milliseconds to their full rotational speed of the order of 500 rpm, which corresponds to the material sheet speed, are kept at this constant speed throughout the entire cutting operation, and are then braked again to the stop situation also in a few milliseconds. Braking is carried out electrically via the motor, a feedback of the braking energy into the grid taking place. Thus, with fairly long formats, the motor stops for a certain period to be accelerated again to cutting speed and then again to be retarded It would also be possible, depending upon the desired format length, to regulate the motor to a lower speed and then to accelerate it to the full speed for the cutting operation. For smaller formats, the motor can be accelerated after the cutting speed to higher speeds than that which corresponds to the cutting synchronous speed, in order to rotate the cutter spindle at increased speed and to carry out the cut before the sheet has moved on by the so-called synchronous format, which corresponds to the circle circumference of the knives 18. The motor can carry out this working cycle several times, for example 5 to 8 times per second. It will be understood that, due to the extremely high accelerations and retardations, not only are the mechanical forces large but also vibrations occur. Furthermore, vibrations are produced also by the electrical side as a result of the control operation, which vibrations act upon all the components and necessitate extreme freedom from play. This is possible with the present gear drive.

It has astonishingly been found that the arrangement of the incremental emitter 43 which substantially influences the electronic control upon the lower cutter spindle, which is only indirectly driven, enables better results to be achieved in respect of freedom from vibration of the drive than its direct mounting on the motor shaft. This contradicts the theory of carrying out the control pick-up as directly as possible. One would expect the maximum vibration excitation and therefore risk of feed-back onto the control to occur on the lower motor shaft. Nevertheless, a more vibration-free operation of the entire system was obtained in this manner. The provision of two motors enables the entire necessary drive power, in comparison with the moment of inertia of the unit comprising motors/cutter spindles, to be optimized. The moment of inertia of a single motor with twice the drive power would be greater. The backlash-free gear wheel drive 21, 22 would also be advantageous if, for example, one of the motors acted upon each of the cutter spindles. In this case, the gear wheel drive would carry out only a synchronization function and not, as in the example shown, also drive the lower cutter spindle. The provision of two motors and of two gear wheel drives at the two ends of the cutter shafts creates completely symmetrical conditions and thereby avoids torsion-induced faults.

I claim:

1. A transverse cutter for sheet materials, especially paper, comprising:

two rotatable cutter spindles, at least one knife disposed at the periphery of each cutter spindle, a drive for the cutter spindles, and at least one gear wheel drive for synchronizing rotation of the two cutter spindles, said at least one gear wheel drive having mutually co-operating gear wheels in meshing engagement under pre-stress and a resilient element being disposed between one of said gear wheels and one of said cutter spindles, said resilient element being resilient to permit displacement in a radial direction, whereby said resilient element permits limited resilient radial movement at a point of circumference where the cooperating gear wheels come closest together during each rotation thereof.

2. A transverse cutter according to claim 1, wherein said resilient element creates a substantially rigid connection between said one cutter spindle and said one gear wheel in the rotational direction.

3. A transverse cutter according to claim 1, wherein both said gear wheels of said at least one gear wheel drive are equipped with a said resilient element.

4. A transverse cutter according to claim 1, wherein radial movements of said gear wheels with respect to the associated cutter spindles during their rotation lie in the range of hundredths of millimeters.

5. A transverse cutter according to claim 1, wherein said resilient element acts also as a clamping element for said one gear wheel on its associated cutter spindle.

6. A transverse cutter according to claim 1, wherein said resilient element consists of two concentric sleeves having end faces, said sleeves being sealingly joined together in the region of their end faces, which sleeves constitute between themselves an annular chamber to be filled with hydraulic liquid under high pressure, the sleeves being expansible under the pressure of the hydraulic liquid for clamping said one gear wheel on its associated cutter spindle.

7. A transverse cutter for sheet materials, especially paper, comprising two rotatable cutter spindles, at least one knife disposed at the periphery of each cutter spindle, a drive for the cutter spindles and at least one gear wheel drive for synchronizing rotation of the two cutter spindles, said at least one gear wheel drive having mutually co-operating gear wheels in meshing engagement under pre-stress and a resilient element being disposed between one of said gear wheels and one of said cutter spindles, said gear wheels being on parallel axes and having a conical form in the meshing zone and being adjusted relative to each other in their pre-stress by axial displacement of the gear wheels, the gear wheels preferably possessing, over the axial length of their meshing zone, a pitch circle of constant diameter, that is lying on a cylindrical surface, while the conical form of the gear wheels is produced by radial tooth profile displacement.

8. A transverse cutter for sheet materials, especially paper, comprising two rotatable cutter spindles, at least one knife disposed at the periphery of each cutter spindle, a drive for the cutter spindles and at least one gear wheel drive for synchronizing rotation of the two cutter spindles, said at least one gear wheel drive having mutually co-operating gear wheels in meshing engagement under prestress and a radially resilient element being disposed between one of said gear wheels and one of said cutter spindles, the cutter further comprising at least one electric motor connected coaxially without intermediate gear with one of said cutter spindles, which electric motor has an extremely short start-up and electrically produced braking time and the start-up and braking of which is controlled by an electronic control device for the purpose of cutting formats which are different from the synchronous format determined by the effective circumference of the cutter spindles, the cutter spindles being accelerated and again braked within a fraction of one revolution, possibly several times per second, between cutting speed and stop or so me other speed, wherein said at least one motor is coupled directly to at least one of the cutter spindle via a torsionally stiff, but otherwise flexible metal bellows coupling.

9. A transverse cutter according to claim 8, wherein said control device is arranged to receive signals from an incremental emitter, which is mounted on that one of the two cutter spindles which is not directly connected with an electric motor.

10. A transverse cutter according to claim 8, wherein two of said electric motors are connected to one cutter spindle and a substantially backlash-free gear wheel drive is provided on each side of the two cutter spindles.

* * * * *